(12) United States Patent
Boland

(10) Patent No.: US 10,576,938 B2
(45) Date of Patent: Mar. 3, 2020

(54) WINDSCREEN WIPER DEVICE

(71) Applicant: FEDERAL-MOGUL S.A., Aubange (BE)

(72) Inventor: Xavier Boland, Arlon (BE)

(73) Assignee: Trico Belgium SA, Aubange (BE)

( * ) Notice: Subject to any disclaimer, the term of this patent is extended or adjusted under 35 U.S.C. 154(b) by 215 days.

(21) Appl. No.: 15/372,608

(22) Filed: Dec. 8, 2016

(65) Prior Publication Data
US 2017/0080902 A1    Mar. 23, 2017

Related U.S. Application Data

(62) Division of application No. 14/342,500, filed as application No. PCT/EP2011/064961 on Aug. 31, 2011, now Pat. No. 9,545,897.

(51) Int. Cl.
*B60S 1/38* (2006.01)
*B60S 1/40* (2006.01)

(52) U.S. Cl.
CPC ............. *B60S 1/3858* (2013.01); *B60S 1/38* (2013.01); *B60S 1/3808* (2013.01); *B60S 1/3853* (2013.01); *B60S 1/3856* (2013.01); *B60S 1/4019* (2013.01); *B60S 1/3877* (2013.01); *B60S 1/4006* (2013.01); *B60S 1/4009* (2013.01); *B60S 2001/4054* (2013.01)

(58) Field of Classification Search
CPC ..... B60S 1/3858; B60S 1/3856; B60S 1/3877
See application file for complete search history.

(56) References Cited

U.S. PATENT DOCUMENTS

| 9,580,047 B2 * | 2/2017 | Boudjenah | ............ B60S 1/3858 |
| 2007/0113366 A1 * | 5/2007 | Walworth | ............ B60S 1/3856 |
| | | | 15/250.32 |
| 2009/0056049 A1 * | 3/2009 | Jarasson | ................ B60S 1/381 |
| | | | 15/250.32 |

FOREIGN PATENT DOCUMENTS

FR    2854852 A1 *    11/2004    .............. B60S 1/386

OTHER PUBLICATIONS

FR2854852A1 (machine translation), 2004.*

* cited by examiner

*Primary Examiner* — Andrew A Horton
(74) *Attorney, Agent, or Firm* — Miller Canfield

(57) ABSTRACT

A windscreen wiper device of the flat blade type, particularly for automobiles, comprising an elastic, elongated carrier element, as well as an elongated wiper blade of the flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein said oscillating arm can be pivotally connected to the connecting device about ta pivot axis near one end thereof. The connecting device is connected to the wiper blade at at least two location spaced-apart in the longitudinal direction of said wiper blade in order to evenly distribute a force exerted by the oscillating arm onto the wiper blade.

6 Claims, 5 Drawing Sheets

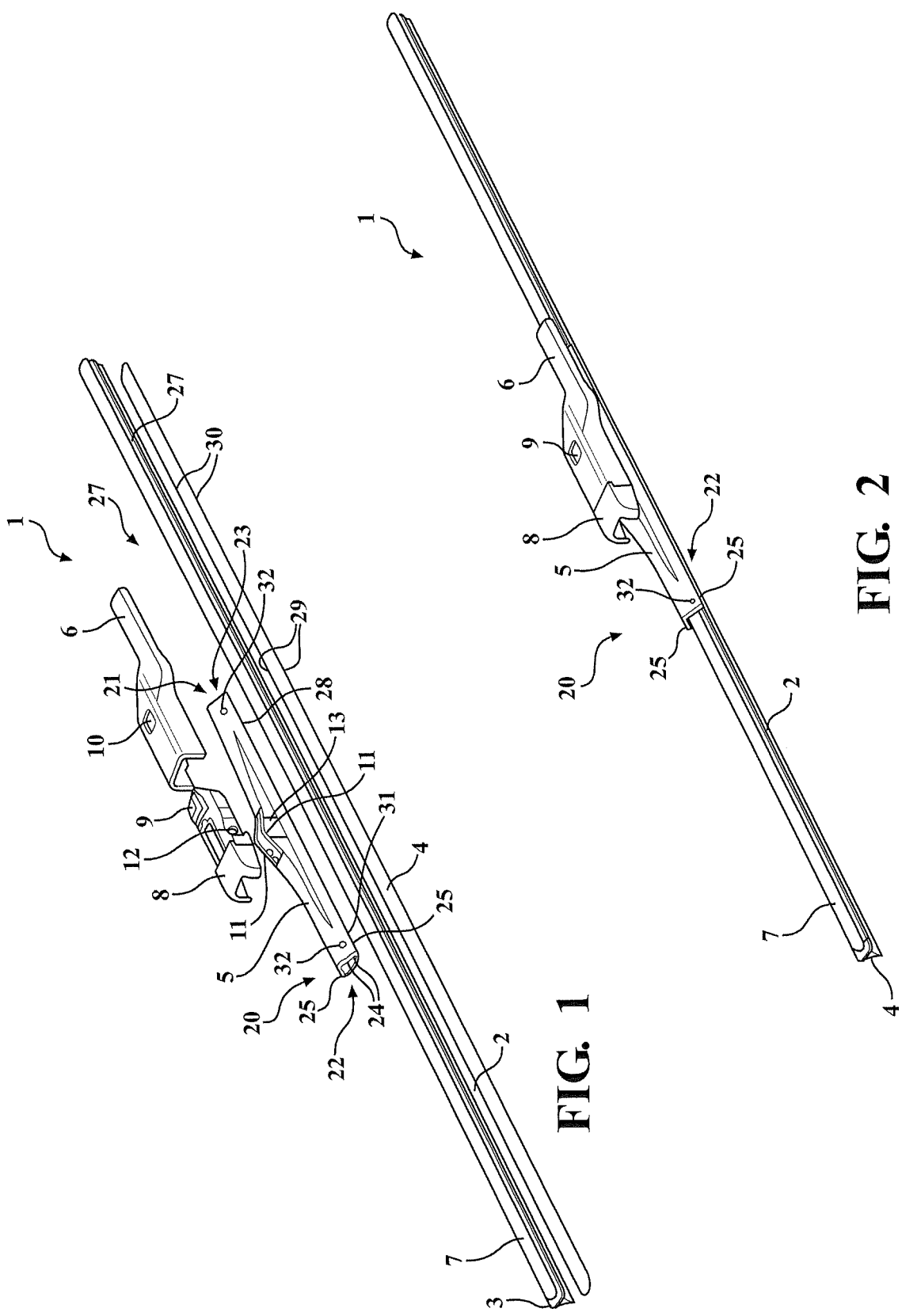

WINDSCREEN WIPER DEVICE

CROSS REFERENCE TO RELATED APPLICATION

Figure 3:
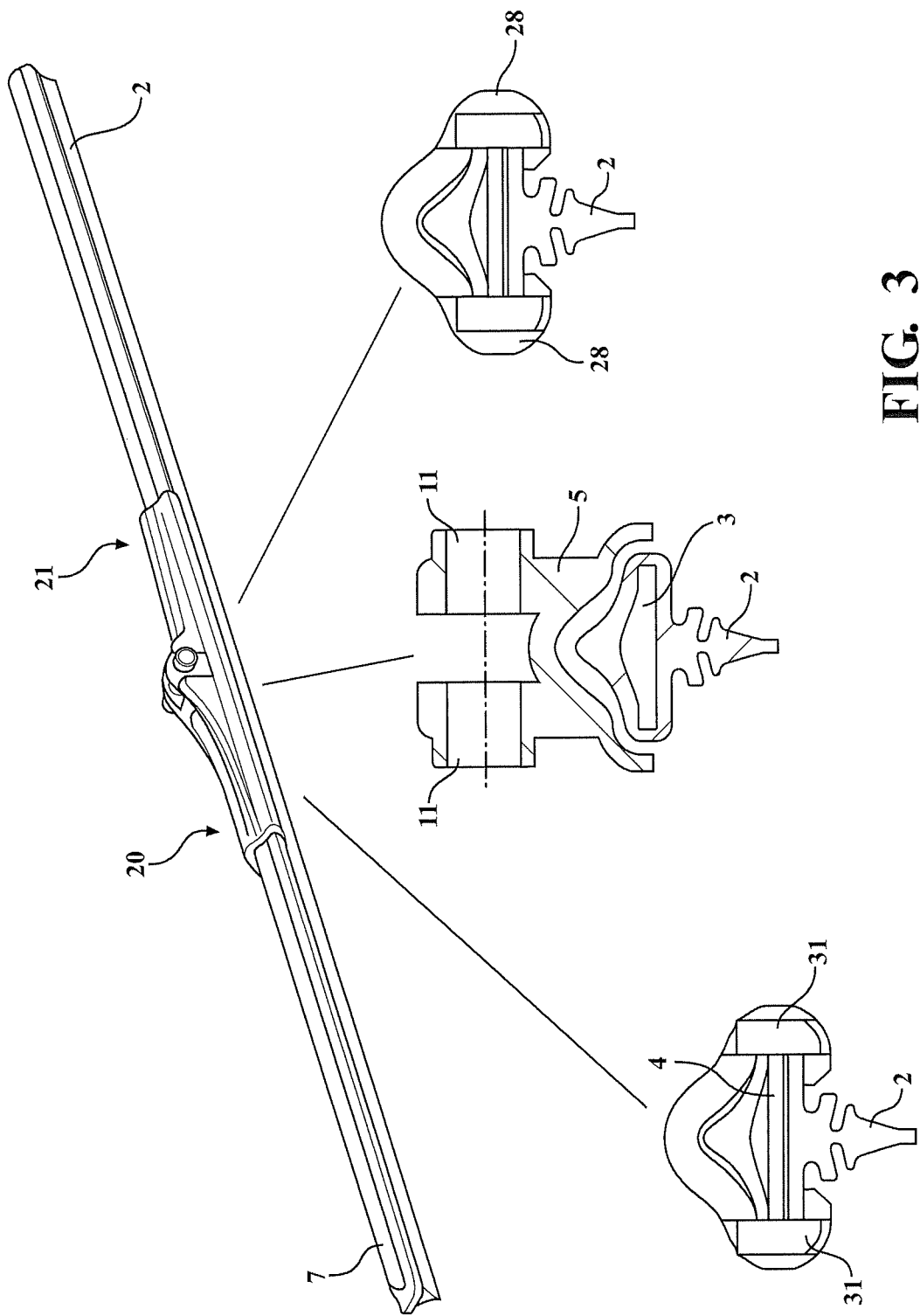

This U.S. Divisional Patent Application claims the benefit of U.S. Utility application Ser. No. 14/342,500, filed Apr. 1, 2014, which claims the benefit of International Application No. PCT/EP2011/064961, filed Aug. 31, 2011, both of which are incorporated herein by reference.

BACKGROUND OF THE INVENTION

1. Technical Field

The present invention relates to a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to the connecting device about a pivot axis near one end thereof. Particularly, the oscillating arm can be pivotally connected to the connecting device with the interposition of a joint part. More in particular, the wiper blade comprises a spoiler at a side thereof facing away from the windscreen to be wiped. the longitudinal groove is preferably a central longitudinal groove accommodating the longitudinal strip. the longitudinal strip is also called a "flexor", while the connecting device is also indicated as a "connector". In the framework of the present invention the connector is preferably made in one piece, also called a "one piece connector".

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. The spoiler is also called an "air deflector".

SUMMARY OF THE INVENTION

The object of the invention is to provide an improved windscreen wiper device.

In order to accomplish that objective, a windscreen wiper device of the type referred to in the introduction is characterized according to the invention in that the connecting device is connected to the wiper blade at at least two locations spaced-apart in longitudinal direction of the wiper blade in order to evenly distribute a force exerted by the oscillating arm onto the wiper blade. Particularly, the locations are located near opposite ends of the connecting device, According to the invention the pressure exerted by the oscillating arm on the wiper blade is thus transmitted over a larger area than in the prior art. This makes the wiping qualities less sensitive to an increase or a decrease of the pressure. For example, the wiping properties are improved, as hazing is avoided at a location of a centre of the wiper blade at high pressures exerted by the oscillating arm. Further, the wiping properties are not adversely affected in case the interconnection between the oscillating arm and the wiper blade lacks sufficient mobility.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade, the groove (s) may be closed at one outer end.

The present windscreen wiper device can be used for large varieties of windscreens to be wiped mutually differing in their curvatures, wherein any tolerances in windscreen shapes may be compensated as well.

In a preferred embodiment of a windscreen wiper device in accordance with the invention at each of the two locations the connecting device comprises a claw for gripping the wiper blade laterally from the outside, Preferably, the claws each have a substantially U-shaped cross-section, wherein free ends of legs of the U-shaped cross-section extend inwardly so as to form grooves for receiving longitudinal sides of the wiper blade.

In another preferred embodiment of a windscreen wiper device according to the invention at least one claw is connected to the flexible material of the wiper blade by at least one pin of a first type, wherein the pin of the first type cooperates with a recess provided along an exterior edge of the longitudinal strip in order to block any movement of the wiper blade in longitudinal direction thereof relative to the longitudinal strip at the location of the interconnection of the claw and the wiper blade. Advantageously, at least two of such pins are provided on opposite sides of the longitudinal strip, wherein the pins are preferably located opposite one another. In a preferred embodiment the connecting device is connected to the flexible material of the wiper blade by the at least one pin being of a first type and at least one pin of a second type, wherein the pin of the second type is cutting the wiper blade at the location of the interconnection of the connecting device and the wiper blade in order to block any lateral movement of longitudinal strip at the location of the interconnection of the connecting device and the wiper blade. In other words, the pin of the first type ensures that the wiper blade and the longitudinal strip are not allowed to mutually move under the connecting device, but particularly in all other areas along the wiper blade a slight movement thereof is made possible in order to allow the wiper blade to follow any curvature of the windscreen to be wiped. It is this interaction between the pin of the first type and the wiper blade that elastomeric material (i.e. usually rubber) of the wiper blade and material of the longitudinal strip (i.e. usually steel) are forced to engage with each other in a locking manner when the connecting device is finally mounted onto the wiper blade, all at the location under the connecting device. the pin of the first type is mounted inside the recess by stamping the pin of the first type through the flexible material of the wiper blade and inside the recess. the pin of the first type and of the second type ensures that the so-called "fishtailing phenomenon" is avoided at all times. the wiper blade at the location outside the connecting device would normally suffer from this "fishtailing phenomenon", wherein the wiper blade on opposite sides of the connecting device vibrates in an uncontrollable manner parallel to the windscreen to be wiped. Obviously, the "fishtailing phenomenon" results in deteriorated wiping properties, with all negative consequences involved, particularly at high speeds. the deformation by the pin of the second type is realized at the time of mounting the connecting device onto the wiper blade during assembly of all relevant parts of the wiper blade, wherein the deformation is particularly effected in a side region of the wiper blade, without having any influence on a bottom region thereof (i.e. containing a wiping lip of the wiper blade). Consequently, wiping properties of the wiper blade are not adversely affected.

In a preferred embodiment of a windscreen wiper device in accordance with the invention the pin of the first type allows movement of the wiper blade in longitudinal direction thereof relative to the longitudinal strip outside the location of the interconnection of the connecting device and the wiper blade. Hence, it is made possible to allow the wiper blade to follow any curvature of the windscreen to be wiped.

In another preferred embodiment of a windscreen wiper device according to the invention the pin of the second type is cutting the wiper blade in the form of a C. Preferably, the pin of the second type exerts a transverse force on the longitudinal strip of the wiper blade, thereby locally (laterally) blocking the longitudinal strip, in order to block any lateral movement of longitudinal strip at the location of the interconnection of the connecting device and the wiper blade, Preferably, no other force than the transverse force is exerted by the pin of the second type.

The pin of the first type and the pin of the second type may be separate, i.e. single constructional elements extending in mounted position at least substantially perpendicular to the windscreen to be wiped.

In another preferred embodiment of a windscreen wiper device in accordance with the invention the free ends of the legs of the U-shaped cross-section are provided with holes, preferably through holes, for receiving the pins of the first type and of the second type. Particularly, one claw is connected to the flexible material of the wiper blade by one pair of opposite pins of the first type, whereas the other claw is connected to the flexible material of the wiper blade by one pair of opposite pins of the second type.

In another preferred embodiment of a windscreen wiper device according to the invention the connecting device is pivotally connected to the oscillating arm with the interposition of a joint part, wherein the joint part is detachably connected to the connecting device by engaging protrusions of the connecting device, at the location of the pivot axis, in recesses provided in the joint part. This is preferably realized through a snapping or clipping operation.

In another preferred embodiment of a windscreen wiper device in accordance with the invention the joint part has an at least substantially U-shaped cross-section at the location of its connection to the connecting device, wherein the joint part is provided with a recess provided coaxially with the pivot axis. In particular, the protrusions extend outwards on either side of the connecting device and are preferably cylindrical in shape. In the alternative, the protrusions are spherical or frusto-conical in shape. the protrusions that function as bearing surfaces are thus paced far apart, so that forces exerted thereon will be relatively low. In yet another preferred variant the joint part is provided with co-axial through holes in legs of the U shaped cross-section thereof, wherein a pivot pin is inserted in the through holes.

In another preferred embodiment of a windscreen wiper device according to the invention the protrusions are provided with co-axial through holes. Accordingly, the wiper blade may then be connected to the oscillating arm on the basis of a so-called "sidelock system". The oscillating arm is provided with a joint pin or a pivot pin to be inserted in the co-axial through holes. the pivot pin protrudes in a direction towards the wiper blade and has a pivot axis extending in a direction of the oscillating movement of the oscillating arm.

In another preferred embodiment of a windscreen wiper device according to the invention the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

THE DRAWINGS

Figure 4:
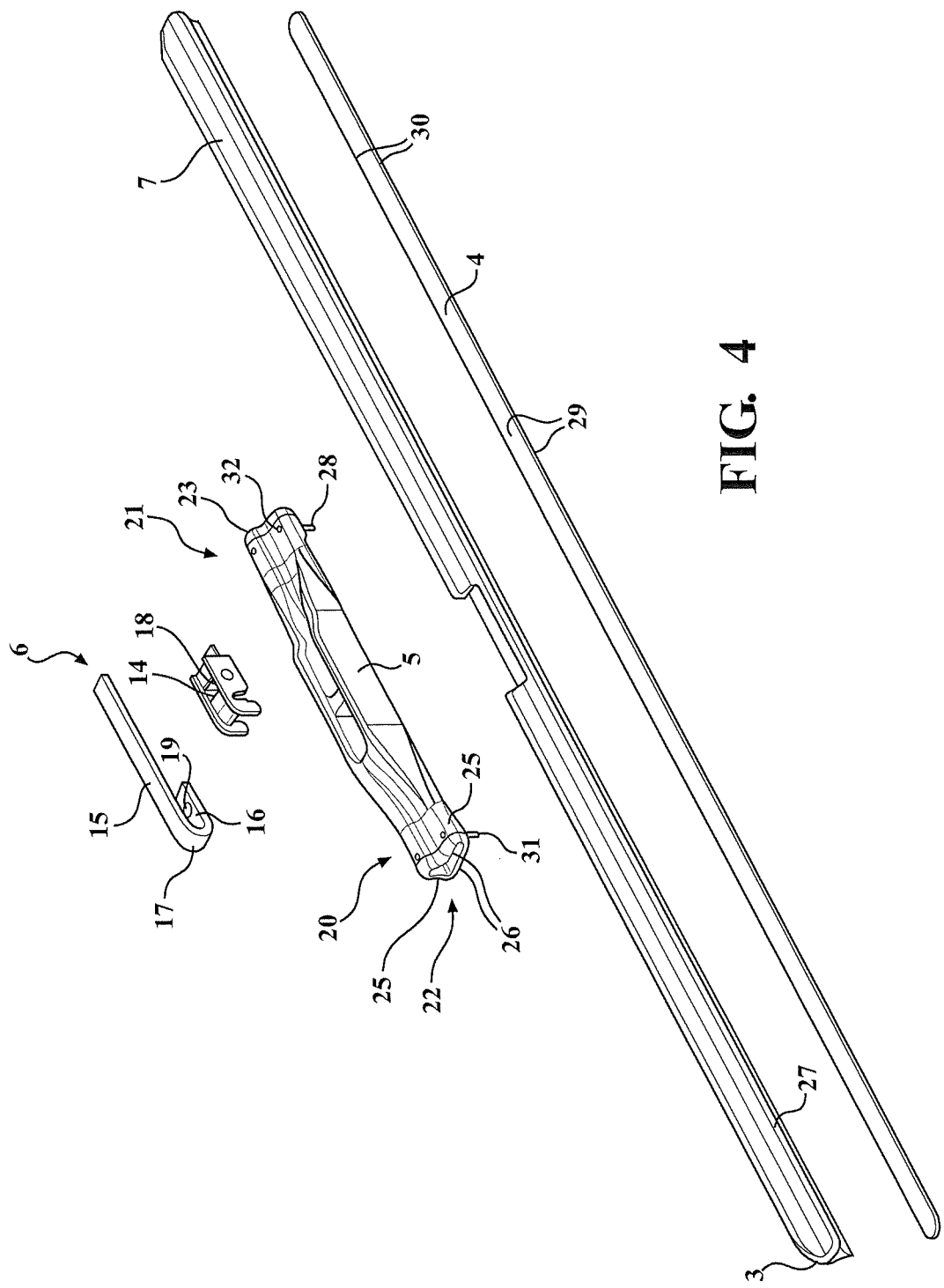
Figure 5:
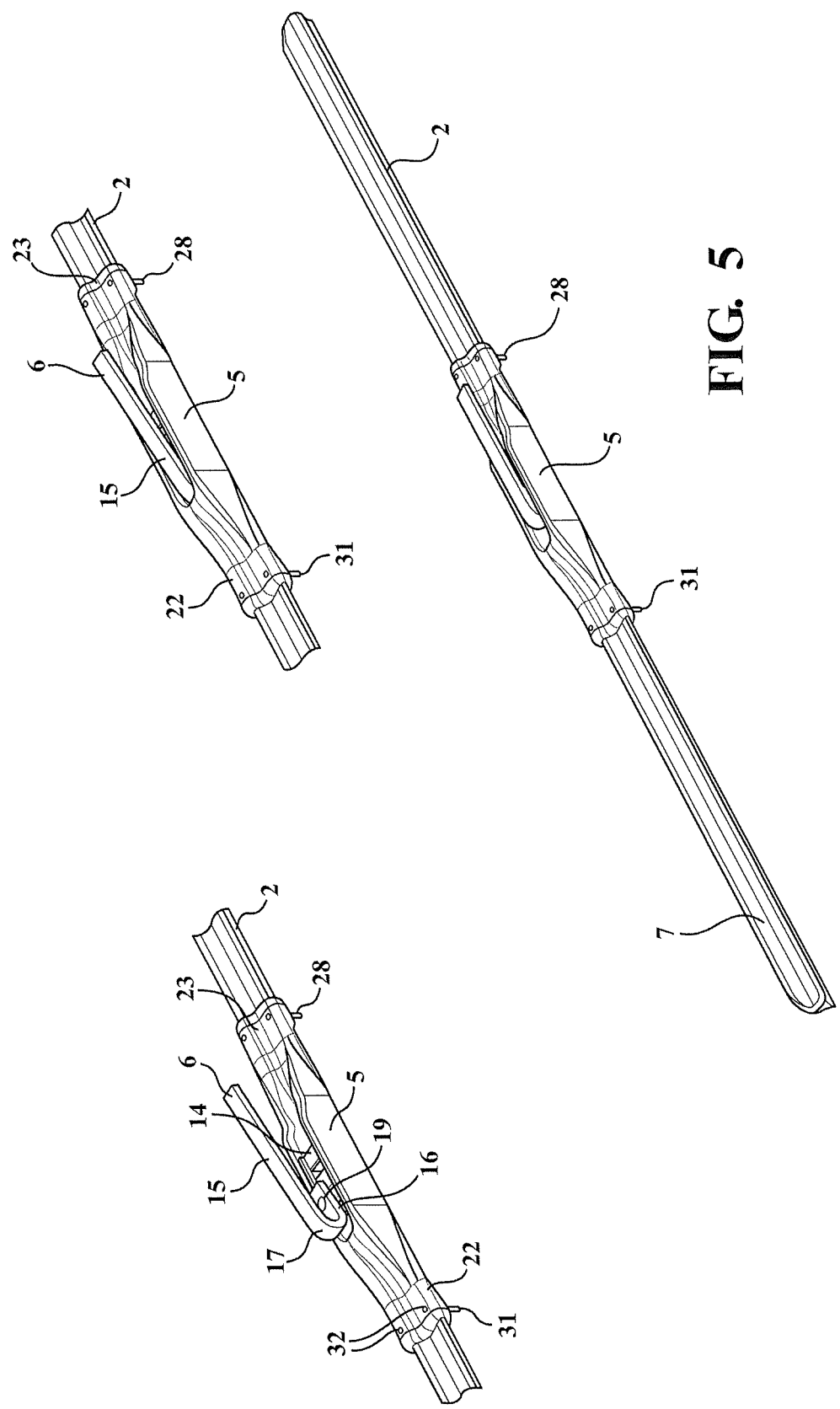
Figure 6:
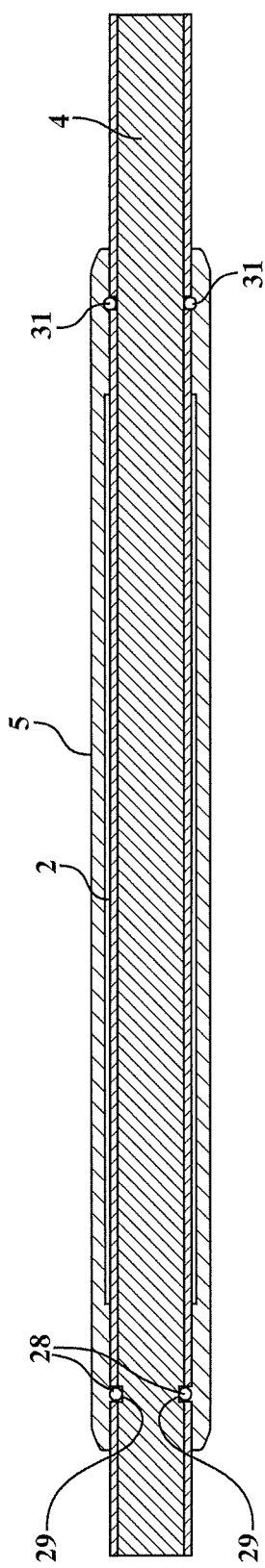

The invention will now be explained more in detail with reference to figures illustrated in a drawing, wherein FIG. 1 is an exploded view of a preferred embodiment of a windscreen wiper device according to the invention, with an oscillating arm;

FIG. 2 is an assembled view of FIG. 1;

FIG. 3 corresponds to FIG. 2 (without oscillating arm), wherein parts thereof are shown in a schematic cross-sectional view;

FIGS. 4 and 5 relate to another preferred embodiment of a windscreen wiper device according to the invention, wherein FIG. 4 is an exploded view, and wherein FIG. 5 is a perspective, schematic view of the windscreen wiper device with the oscillating arm (during assembly and after assembly; and FIG. 6 is a cross-sectional view of the windscreen wiper device of FIGS. 1 and 5, seen at the location of the connecting device and from the bottom.

DETAILED DESCRIPTION

FIG. 1 shows a preferred variant of a windscreen wiper device 1 of the flat blade type according to the invention, the windscreen wiper device 1 is built up of an elastomeric wiper blade 2 comprising a central or middle longitudinal groove 3, wherein a central or middle longitudinal strip 4 made of spring band steel is fitted in the longitudinal groove 3 (see FIGS. 2 and 6). the strip 4 forms a flexible carrier element for the rubber wiper blade 2, as it were which is thus biased in a curved position (the curvature in operative position being that of a windscreen to be wiped). An end of the strip 4 and/or an end of the wiperblade 2 may be connected on either side of the windscreen wiper device 1 to respective connecting pieces or "end caps". In the embodiments of FIGS. 1 and 5, no use is made of such end caps. The windscreen wiper device 1 is furthermore built up of a connecting device 5 for connecting an oscillating wiper arm 6 thereto. The oscillating wiper arm 6 can be pivotally connected to the connecting device 5 about a pivot axis near one end. The preferred embodiments of FIGS. 1 and 5 according to the invention comprise a spoiler or "air deflector" 7 which is made in one piece with the rubber wiper blade 2 and which extends along the entire length thereof.

With reference to FIG. 1, the connecting device 5 with the wiper blade 2 is mounted onto the oscillating arm 6 as follows. A joint part 8 being already clipped onto the connecting device 5 is pivoted relative to the connecting device 5, so that the joint part 8 can be easily slided on a free end of the oscillating arm 6. During this sliding movement a resilient tongue 9 of the joint part 8 is initially pushed in against a spring force and then allowed to spring back into a hole 10 of the oscillating arm 6, thus snapping, that is clipping the resilient tongue 9 into the hole 10. This is a so-called "bayonet-connection". The oscillating arm 6 together with the joint part 8 may then be pivoted back in a position parallel to the wiper blade 2 in order to be ready for use. B subsequently pushing in again the resilient tongue 9 against the spring force (as if it were a push button), the connecting device 5 and the joint part 8 together with the wiper blade 2 may be released from the oscillating arm 6. Dismounting the connecting device 5 with the wiper blade 2 from the oscillating arm 6 is thus realized by sliding the connecting device 5 and the joint part 8 together with the wiper blade 2 in a direction away from the oscillating arm 6. The connecting device 5 comprises two cylindrical protrusions 11 extending outwards on either side of the connecting device 5, These protrusions 11 pivotally engage in identically shaped cylindrical recesses 12 of the plastic joint part 8, the protrusions 11 act as bearing surfaces at the location of the pivot axis in order to pivot the joint part 8 (and the oscillating arm 6 attached thereto) about the pivot axis near one end of the oscillating arm 6. In an alternative embodiment the protrusions 11 are provided with co-axial through holes 13. Accordingly, the wiper blade 2 may then be connected to the oscillating arm 6 on the basis of a so-called "sidelock system". The oscillating arm 6 is provided with a joint pin or a pivot pin to be inserted in the coaxial through holes 13. the pivot pin protrudes in a direction towards the wiper blade 2 and has a pivot axis extending in a direction of the oscillating movement of the oscillating arm 6.

With reference to FIGS. 4 and 5, the connecting device 5 with the wiper blade 2 is mounted onto the oscillating arm 6 as follows. Again, a joint part 14 being already clipped onto the connecting device 5 is pivoted relative to the connecting device 5, so that the joint part 14 can be easily slided on a free end of the oscillating arm 6. As can be seen from FIG. 4, the oscillating arm 6 includes two parallel longitudinal arm sections 15,16 connected to each other by means of a curved intermediate section 17, wherein the sections 15,16,17 are in one piece. the joint part 14 comprises a protrusion 18 adapted to engage into a correspondingly shaped hole 19 provided in the longitudinal arm section 16 of the oscillating arm 6. Again, this is a so-called "bayonet-connection". The oscillating arm 6 together with the joint part 14 may then be pivoted back in a position parallel to the wiper blade 2 in order to be ready for use (FIG. 5).

Although not shown in FIGS. 1 and 5, but fully understood by a skilled person, the oscillating arm 6 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 5 moves the wiper blade 2.

In the preferred embodiments of FIGS. 1 and 5 the connecting device 5 near its opposite ends is connected to the wiper blade 2 at two locations 20,21 spaced-apart in longitudinal direction of the wiper blade 2 in order to evenly distribute a force exerted by the oscillating arm onto the wiper blade 2. More in particular, at each of the two locations 20, 21 the connecting device 5 comprises a claw 22,23 for gripping the wiper blade 2 laterally from the outside, the claws 22, 23 each have a substantially U-shaped cross-section, wherein free ends 24 of legs 25 of the U-shaped cross-section extend inwardly so as to form grooves 26 for receiving longitudinal sides 27 of the wiper blade 2. One claw 23 is connected to the flexible material of the wiper blade 2 by two pins 28 of a first type, wherein the pins 28 cooperate with a recesses 29 provided along exterior edges 30 of the longitudinal strip 4 (see FIGS. 2 and 6) in order to block any movement of the wiper blade 2 in longitudinal direction thereof relative to the longitudinal strip 4 at the location of the interconnection of the claw 23 and the wiper blade 2, as well as to block any lateral movement of the longitudinal strip 4, The other claw 22 is connected to the flexible material of the wiper blade 2 by two pins 31 of a second type. the pins 31 of the second type are cutting the wiper blade 2 in the form of a C at the location of the interconnection of the connecting device 5 and the wiper blade 2 in order to block any lateral movement of longitudinal strip 4 at the location of the interconnection of the connecting device 5 and the wiper blade 2, In other words, the pins 31 of the second type exert a transverse force on the longitudinal strip 4 of the wiper blade 2, thereby locally (laterally) blocking the longitudinal strip 4. Both types of pins 28, 31 extend perpendicular to the windscreen to be wiped. As can be seen from FIGS. 1 and 4, the free ends 24 of the legs 25 of the U-shaped cross-section are provided with holes 32 for receiving the pins 28, 31 of the first type and of the second type.

The invention is not restricted to the variants shown in the drawing, but it also extends to other preferred embodiments that fall within the scope of the appended claims.

What is claimed is:

1. A windscreen wiper device of the flat blade type, particularly for automobiles, comprising
an elastic, elongated carrier element,
an elongated wiper blade of a flexible material that can be placed in abutment with a windscreen to be wiped, said wiper blade including at least one longitudinal groove, in which groove at least one longitudinal strip of the carrier element is disposed,
a connecting device for an oscillating arm, wherein said oscillating arm can be pivotally connected to said connecting device about a pivot axis near one end thereof, wherein said connecting device is connected to said wiper blade in at least two locations spaced-apart in a longitudinal direction of said wiper blade in order to evenly distribute a force exerted by the oscillating arm onto the wiper blade, and
wherein said connecting device includes a claw provided at each of said at least two locations, wherein a pin of a first type is supported by said claw at one of said two locations and is received in a notch of said carrier element and a pin of a second type is supported by said claw at the other of said two locations and is received in a notch of said wiper blade without extending into said carrier element.

2. The windscreen wiper device according to claim 1, wherein said pin of the second type is cutting said wiper blade in the form of a C.

3. The windscreen wiper device according to claim 1, wherein said pin of the second type exerts a transverse force on said longitudinal strip thereby locally blocking said at least one longitudinal strip to restrict any lateral movement of said at least one longitudinal strip at one of said at least two locations.

4. The windscreen wiper device according to claim 1, wherein said pin extends at least substantially perpendicular to the windscreen to be wiped.

5. The windscreen wiper device according to claim 1, wherein said pin of a second type cuts said wiper blade at one of said at least two locations to restrict lateral movement of said at least one longitudinal strip.

6. The windscreen wiper device according to claim 5, wherein said connecting device has a substantially U-shaped cross section wherein free ends of of legs of said U-shaped cross-section are provided with holes for receiving said pin.

* * * * *